(12) United States Patent
Mysore Ramesh et al.

(10) Patent No.: US 12,612,108 B2
(45) Date of Patent: Apr. 28, 2026

(54) CROSS MEMBER ARRANGEMENT

(71) Applicant: Volvo Truck Corporation, Gothenburg (SE)

(72) Inventors: Deepak Mysore Ramesh, Mysore (IN); Kamal Kolla, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 441 days.

(21) Appl. No.: 18/489,931

(22) Filed: Oct. 19, 2023

(65) Prior Publication Data

US 2024/0149946 A1 May 9, 2024

(30) Foreign Application Priority Data

Nov. 9, 2022 (EP) ..................................... 22206340

(51) Int. Cl.
  B62D 21/03 (2006.01)
  B62D 21/08 (2006.01)
  B62D 21/17 (2006.01)
(52) U.S. Cl.
  CPC ............. B62D 21/08 (2013.01); B62D 21/03 (2013.01); B62D 21/17 (2013.01)
(58) Field of Classification Search
  CPC ........ B62D 21/02; B62D 21/03; B62D 21/08; B62D 21/10; B62D 21/12; B62D 21/17;
  (Continued)

(56) References Cited

U.S. PATENT DOCUMENTS 6,330,778 B1 * 12/2001 Jakobsson .............. B62D 21/09
52/837
6,634,673 B1 * 10/2003 Verhaeghe ........... B62D 29/041
280/781
(Continued)

FOREIGN PATENT DOCUMENTS

CN 103085877 A 5/2013
CN 110937021 A 3/2020
(Continued)

OTHER PUBLICATIONS

Extended European Search Report for European Patent Application No. 22206340.6, mailed May 16, 2023, 6 pages.

*Primary Examiner* — Gregory A Blankenship
(74) *Attorney, Agent, or Firm* — Withrow & Terranova, PLLC

(57) ABSTRACT

A cross member arrangement for a chassis of a heavy vehicle comprising a main piece comprising a first and a second peripheral section for attachment to a first and a second beam of the chassis, respectively, and a mid-section attached to the first and second peripheral section. The mid-section comprises a first transverse plate sub-section placed in a first transverse plane, and a longitudinal plate sub-section placed in a longitudinal plane. A first side of the longitudinal plate sub-section abuts the first transverse plate sub-section. The longitudinal plate sub-section is provided with one or several transversal recesses facing away from the first transverse plate sub-section. The cross member arrangement further comprises a second transverse plate piece arranged to be attached to the longitudinal plate sub-section of the mid-section and to be placed in a second transversal plane in a mounted state.

14 Claims, 5 Drawing Sheets

(58) Field of Classification Search
 CPC .... B62D 21/20; B62D 25/2054; B62D 27/06;
 B62D 27/065
 USPC ...................... 296/187.01, 187.08, 184.1, 20
 See application file for complete search history.

(56) References Cited

U.S. PATENT DOCUMENTS

| | | | | |
|---|---|---|---|---|
| 2005/0116459 | A1* | 6/2005 | Ito ........................... | B62D 21/02 |
| | | | | 280/788 |
| 2007/0216147 | A1* | 9/2007 | Ramsey ................. | B60G 9/003 |
| | | | | 280/781 |
| 2017/0370451 | A1* | 12/2017 | Wall ....................... | B62D 21/20 |
| 2020/0317039 | A1 | 10/2020 | Chung et al. | |
| 2021/0078635 | A1* | 3/2021 | Kale ....................... | B62D 21/03 |
| 2022/0183165 | A1* | 6/2022 | Johansson ............ | H05K 5/0073 |
| 2024/0149946 | A1* | 5/2024 | Mysore Ramesh .... | B62D 21/08 |
| 2025/0145219 | A1* | 5/2025 | Singh .................... | B62D 21/02 |
| 2025/0178670 | A1* | 6/2025 | Nguyen ................. | B62D 21/02 |

FOREIGN PATENT DOCUMENTS

| | | | |
|---|---|---|---|
| CN | 211223604 | U | 8/2020 |
| CN | 112550461 | A | 3/2021 |
| CN | 113879400 | A | 1/2022 |
| JP | 4064641 | B2 | 3/2008 |

* cited by examiner

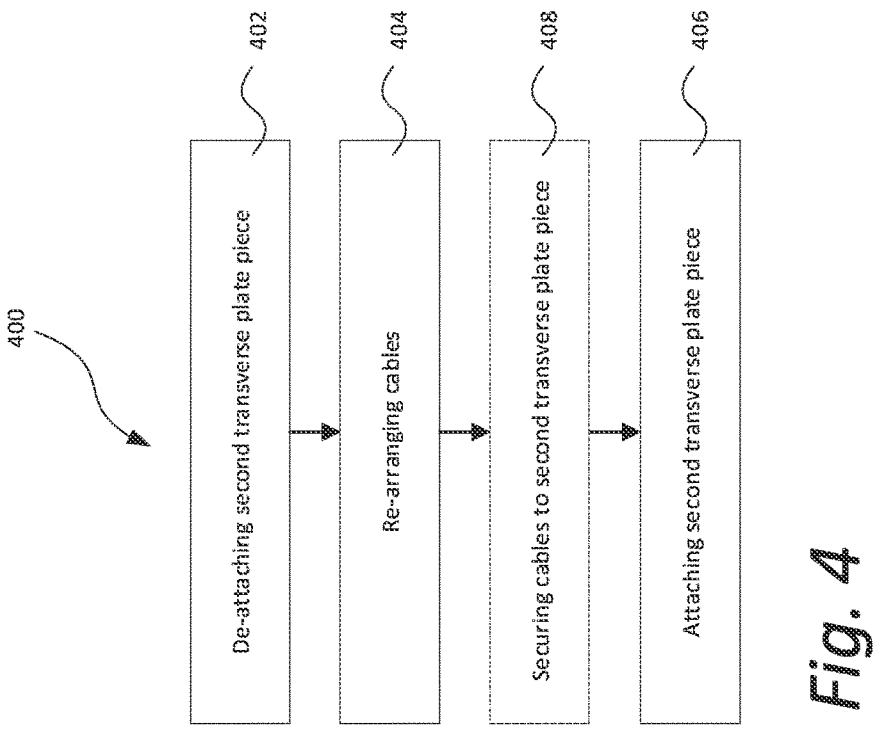

400

De-attaching second transverse plate piece — 402

Re-arranging cables — 404

Securing cables to second transverse plate piece — 408

Attaching second transverse plate piece — 406

*Fig. 4*

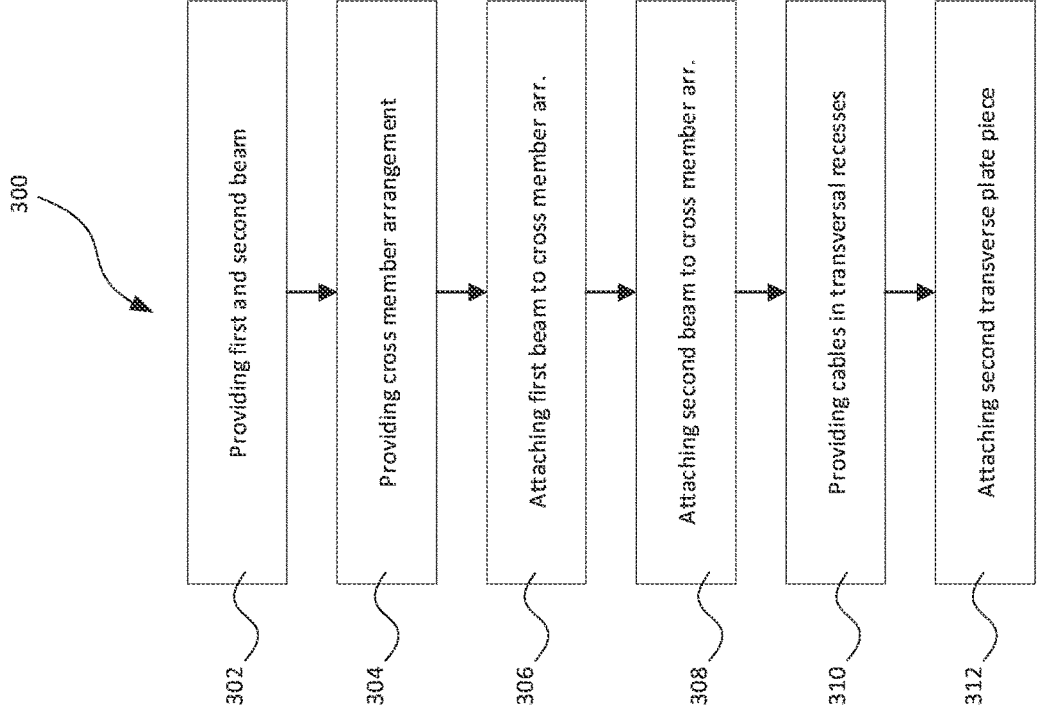

300

Providing first and second beam — 302

Providing cross member arrangement — 304

Attaching first beam to cross member arr. — 306

Attaching second beam to cross member arr. — 308

Providing cables in transversal recesses — 310

Attaching second transverse plate piece — 312

*Fig. 3*

CROSS MEMBER ARRANGEMENT

RELATED APPLICATIONS

The present application claims priority to European Patent Application No. 22206340.6, filed on Nov. 9, 2022, and entitled "CROSS MEMBER ARRANGEMENT," which is incorporated herein by reference in its entirety.

TECHNICAL FIELD

The disclosure relates generally to a load bearing framework for a vehicle. In particular aspects, the disclosure relates to a cross member arrangement for a chassis of a heavy vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

Even though heavy vehicles of today can be produced in different ways, most of them have in common that they are based on a load bearing framework, sometimes referred to as understructure or chassis. A general approach for forming such framework is to have two beams, placed in parallel and extending longitudinally. These beams can be attached to each other by two or more cross members. Usually, there is at least one cross member placed in a front section of the framework and at least one cross member placed in a rear section of the framework to make sure that this can withstand forces stemming from different load cases.

A commonly used cross member comprises a U-shaped center piece with four tie plates attached thereto. When attached to a left and a right U-shaped beam to form the framework, the U-shaped center piece can be arranged such that one of the side sections is facing upwards, another side section is facing downwards and an open section is facing a rear end of the framework. The left and the right beams may be arranged with their open sections facing the cross member such that this can be housed partly inside the left and right beam, respectively, thereby providing a stable construction. The center piece is usually attached to the left and right beams via the tie plates. A first tie plate is attached to an upper left end of the side section facing upwards, a second tie plate is attached to an upper right end of the side section facing upwards, a third tie plate is attached to a lower left end of the side section facing downwards, and a fourth tie plate is attached to a lower right end of the side section facing downwards. The tie plates are usually attached to the side sections of the center piece by using rivets. Further, the tie plates are often L-shaped such that each tie plate, once mounted to the center piece, is provided with a flat surface facing a mid-section of the right or left beam. The flat surfaces as well as the mid-sections of the left and right beams are provided with holes such that these can be attached to each other by using rivets.

The U-shaped cross-members used today in combination with the U-shaped beams provides for that the framework can withstand a range of different forces, which in turn provides for that a reliable truck or other heavy vehicle can be provided.

A further advantage with the current framework arrangement is that the combination of beams, sometimes also referred to as side rails, and cross members provides for that a large variety of frameworks can be achieved. Put differently, with a relatively small number of components, a large number of different frameworks can be achieved.

Even though the framework arrangement of today serves its purpose well, there is a need to provide even more versatility without compromising on the load bearing capacity.

SUMMARY

According to a first aspect of the disclosure, a cross member arrangement for a chassis of a heavy vehicle is provided. The arrangement may comprise a main piece comprising a first and a second peripheral section for attachment to a first and a second beam of the chassis, respectively, and a mid-section attached to the first and second peripheral section. The mid-section may comprise a first transverse plate sub-section placed in a first transverse plane, and a longitudinal plate sub-section placed in a longitudinal plane. A first side of the longitudinal plate sub-section may abut the first transverse plate sub-section. The longitudinal plate sub-section may be provided with one or several transversal recesses facing away from the first transverse plate sub-section. The cross-member arrangement may further comprise a second transverse plate piece arranged to be attached to the longitudinal plate sub-section of the mid-section and to be placed in a second transversal plane in a mounted state. The transversal recesses may be formed into transversal openings in the mounted state with the second transverse plate piece attached to the longitudinal plate sub-section of the mid-section. The first aspect of the disclosure may seek to provide a versatile cross member arrangement that can efficiently house electric cables as well as electrical components. A technical benefit may include that the second transverse plate piece can be dismounted such that the transversal openings are made into the transversal recesses. As an effect of this electrical cables can be routed inside the recesses. Once put in place, the second transverse plate piece can be mounted such that the transversal recesses are formed into the transversal openings with the effect that the electrical cables are securely held inside the cross member arrangement.

In some examples, the main piece may be cast in one piece. A technical benefit may include that the cross member arrangement is made of two pieces instead of five pieces, which is today typical for cross members (one central piece and four tie plates). As an effect, more cost efficient production is made possible. A further benefit of having the main piece casted in one piece is that there is no or at least less need for rivets, which comes with the benefit that there are no or fewer protrusions on the cross-member arrangement, which in turn reduces the risk of damaging cables.

In some examples, the main piece is made of metal, preferably Aluminum or an alloy thereof. A technical benefit may include that a weight of the cross member arrangement can be reduced.

In some examples, the first and second peripheral sections may be U-shaped, thereby forming a first and a second peripheral passage. By having open ends facing the first and second beams, respectively, the first peripheral passage can be formed by the first peripheral section and the first beam in the mounted state, and the second peripheral passage can be formed by the second peripheral section and the second beam in the mounted state. In this way, electric cables can be both routed via the transversal openings in the mid-section as well as in the first and second peripheral passages. Since the transversal openings are more easily accessible due to that the second transverse plate piece can be demounted, electrical cables more likely to be needed to be replaced may be routed in the transversal openings while cables less likely to be needed to be replaced may be routed in the first or second peripheral passages. Another option is to have the transversal recesses dedicated to customized equipment, i.e., post-mounted equipment, sometimes referred to as body builder equipment.

In some examples, the second transverse plate piece may be provided with holes for receiving bolts and the longitudinal plate sub-section may be provided with threaded holes for receiving the bolts. By having such holes, it is made possible to release the second transverse plate piece by unscrewing the bolts from below. This is advantageous in that cable re-routing or adding cables can easily be done by accessing the cross member arrangement via a grease pit or the like.

In some examples, the cross-member arrangement may be symmetric with respect to a longitudinal symmetry line. A benefit of having the arrangement symmetric in this way is that there is less risk for mistakes during assembly.

In some examples, the first and second peripheral sections may be symmetric with respect to a transversal symmetry line. An advantage with this is that the arrangement can be mounted with the second transverse plate piece facing upwards or downwards. By having the second transverse plate piece facing upwards it will be difficult to demount this after the vehicle has been produced, which may be useful if re-routing of the cables is not to be encouraged. On the other hand, if having the second transverse plate piece facing downwards, the second plate piece can easily be demounted, which provides for re-routing or replacement of cables can be facilitated.

In some examples, a peripheral vertical distance between a first peripheral vertical end and a second peripheral vertical end of the first and second peripheral sections may be greater than a mid-section vertical distance between a first mid-section vertical end and a second mid-section vertical end such that a first and/or second space for holding electric or electronic components are formed. An advantage with this is that there is space provided for housing electric or electronic components.

In some examples, the second transverse plate piece may be provided with protrusions arranged to interact with the longitudinal plate sub-section in the mounted state. By having these protrusions, a risk of clamping the cables when closing the transversal recesses into the transversal openings can be reduced.

In some examples, an outer surface of the first transverse plate sub-section, said outer surface facing away from the longitudinal plate sub-section, may be void of protruding attachment elements. By not having any protruding elements, such as rivets, the risk of damaging cables can be reduced.

According to a second aspect of the disclosure, it is provided a chassis comprising a frame, said frame comprising a first and a second beam connected to each other by a cross member arrangement according to the first aspect.

According to a third aspect of the disclosure, it is provided a vehicle comprising the chassis according to the second aspect.

According to a fourth aspect of the disclosure, it is provided a method for producing the chasses comprising providing a first and a second beam, providing a cross member arrangement according to the first aspect, attaching the first beam to the first peripheral section of the cross member arrangement, attaching the second beam to the second peripheral section of the cross member arrangement, providing cables in the transversal recesses in the mid-section of the cross-member arrangement, and attaching the second transverse plate piece such that the transversal recesses are formed into transversal openings, thereby securing the cables in the cross member arrangement.

According to a fifth aspect of the disclosure, it is provided a method for re-routing cables in a vehicle comprising a cross member arrangement according to the first aspect, said method comprising de-attaching the second transverse plate piece such that the transversal openings are formed into transversal recesses, thereby releasing cables held in the transversal openings, re-arranging the cables, attaching the second transverse plate piece such that the transversal recesses are formed into transversal openings, thereby securing the re-arranged cables in the cross member arrangement.

Re-arranging the cables should in this context comprise re-arranging existing cables already held in the transversal openings before de-mounting the second transverse plate piece, but also replacing one or several of these existing cables and also adding or removing cables.

In some examples, the method may further comprise, preceding the step of attaching the transverse plate piece, securing the cables to the second transverse plate piece by using cable ties.

An advantage with securing the cables to the second transverse plate piece by using the cable ties before the second transverse plate piece is attached to the main piece is that the cables can be organized and secured to a piece that is not attached to the vehicle. This provides for that a more ergonomic working position can be achieved.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 3 is a flowchart illustrating a method for producing a chassis.

FIG. 4 is a flowchart illustrating a method for re-routing cables.

DETAILED DESCRIPTION

Aspects set forth below represent the necessary information to enable those skilled in the art to practice the disclosure.

Even though the cross-members used today when producing heavy-duty vehicles as well as other types of vehicles are both cost efficient in that the same piece of equipment can be used for a large variety of chassis, meeting different demands, and provide reliable load bearing capacity, there is a need to provide for more efficient cable routing and housing of electric and electronic components within the cross member without compromising on cost-efficiency and load bearing capacity. In addition, since it is common that heavy vehicles are customized to meet specific needs, it is also beneficial to be able to offer a framework that not only can provide efficient cable routing and housing of components, but also provide a flexibility and versatility to adapt the cable routing and housing of the components post-production.

Generally, the inventive concept offers a cross member arrangement comprising two parts that can be de-attached such that the cable routing openings can be made into recesses that can easily be accessed, thereby turning the cross member arrangement into not only a piece providing load bearing functionality but also providing efficient cable routing.

Figures 1A, 1B:
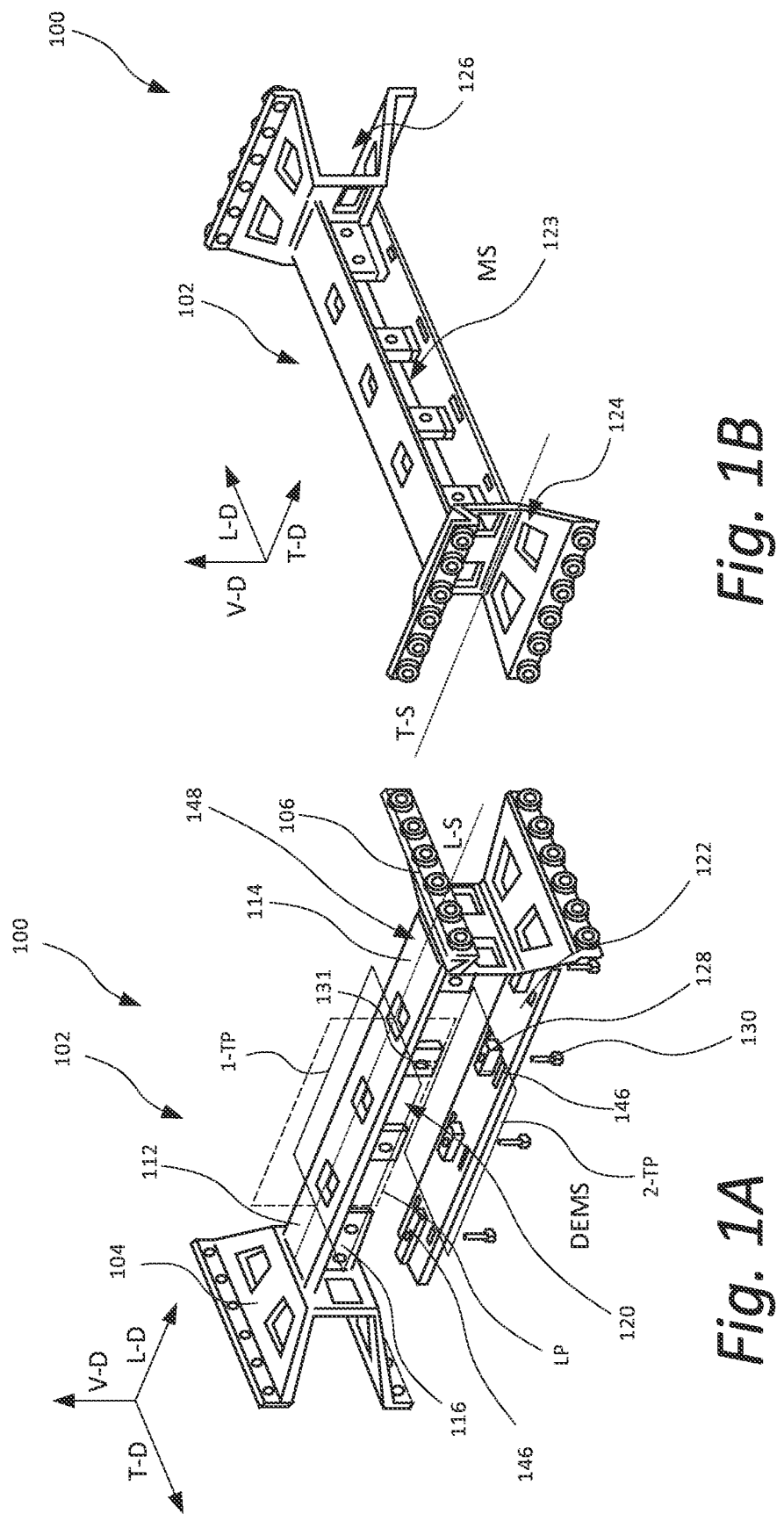
FIG. 1A is a perspective view of a cross member arrangement in a de-mounted state according to one example.
FIG. 1B is another perspective view of the cross member arrangement illustrated in FIG. 1A, but in this figure in a mounted state.
Figure 1C:
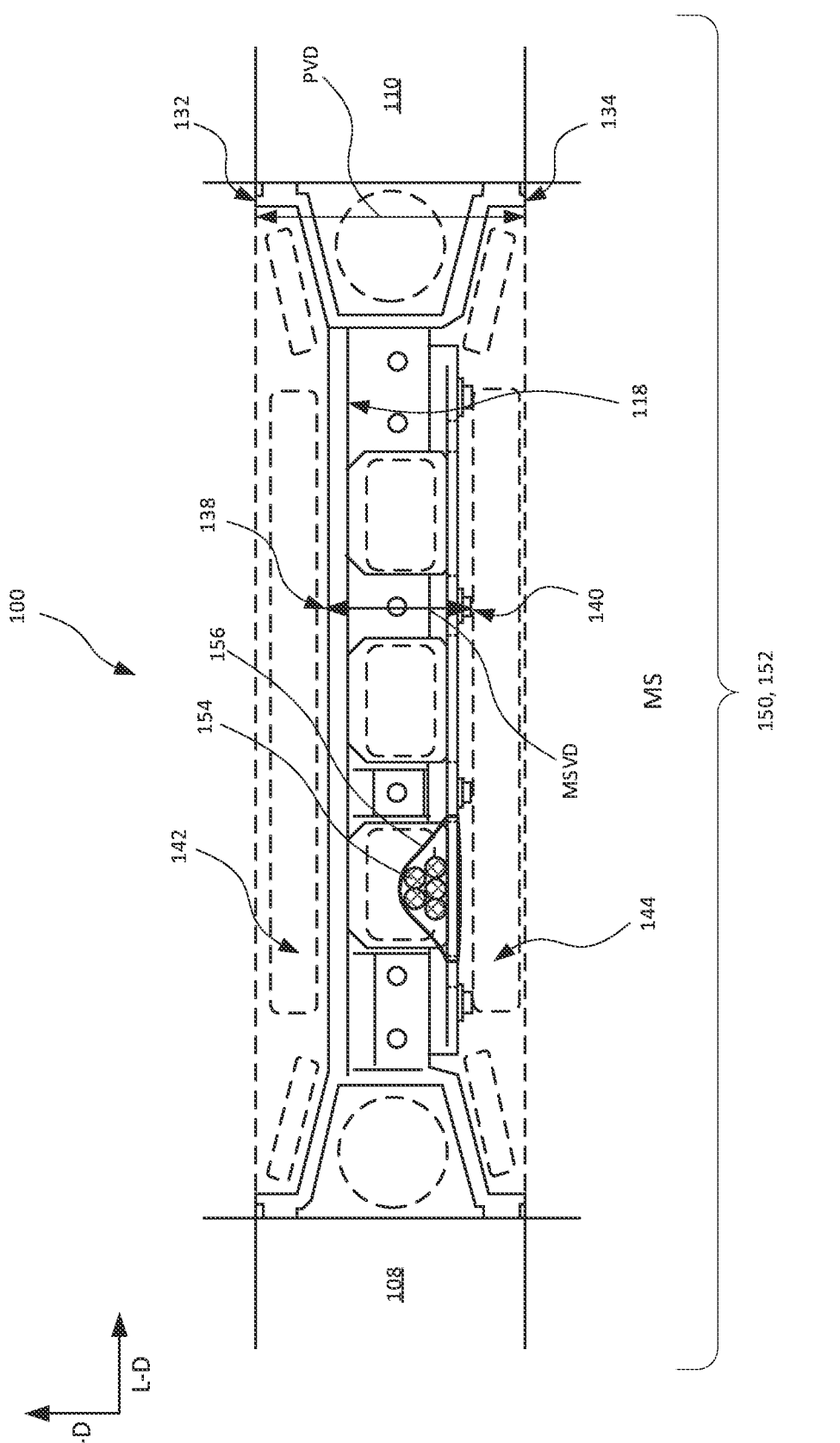
FIG. 1C is a front view of the cross member arrangement illustrated in FIG. 1A and FIG. 1B.

FIGS. 1A, 1B and 1C illustrate by way of example a cross member arrangement 100. The main piece 102 can comprise a first peripheral section 104 and a second peripheral section 106. The first peripheral section 104 can be attached to a first beam 108 (illustrated in FIG. 1C) and the second peripheral section 106 can be attached to a second beam 110 (also illustrated in FIG. 1C). Between the first and second peripheral section 104, 106, a mid-section 112 can be provided. This mid-section 112 may in turn comprise a first transverse plate sub-section 114 placed in a first transverse plane 1-TP and a longitudinal plate sub-section 116 placed in a longitudinal plane LP. A first side 118 (illustrated in further detail in FIG. 1C) of the longitudinal plate sub-section 116 may connect the first transverse plate sub-section 114 such that a T-shaped cross-section in a transversal direction T-D is formed. The longitudinal plate sub-section 116 may be provided with transversal recesses 120. In the example illustrated, three transversal recesses 120 are provided, but the number of recesses as well as how these are shaped may be different in other examples. One reason for having more recesses and also differently shaped recesses may be to better meet geometrical properties of electrical cables and/or electric components to be housed within the recesses.

In addition to the main piece 102, a second transverse plate piece 122 may be provided. As illustrated, this piece may be placed in a second transversal plane 2-TP, parallel with the first transversal plane 1-TP. In a demounted state DEMS, illustrated in FIG. 1A, the second transverse plate piece 122 and the main piece 102 can be de-attached. In this state, the transversal recesses 120 are easily accessible. When having the second transverse plate piece 122 attached to the main piece 102, in a mounted state MS, illustrated in FIG. 1B, the transversal recesses 120 are formed into transversal openings 123. Put differently, the recesses 120 are closed such that the cables placed in the recesses 120 are held securely in place. In case the cross member arrangement 100 is mounted with the first transverse plate sub-section 114 placed above the longitudinal plate sub-section 116, as illustrated in FIGS. 1A, 1B and 1C, the cables can easily be replaced, re-organized or in any other way handled by first de-attaching the second transverse plate piece 122 such that the transversal openings 123 are changed into transversal recesses 120, thereafter handle the cables, and once having the cables in place re-attach the second transverse plate piece 122.

In addition to housing cables and/or components in the transversal openings 123 and the transversal recesses 120, the cables and/or components may also be placed in a first peripheral passage 124 and/or a second peripheral passage 126. As illustrated, the first peripheral passage 124 can be formed by having the first peripheral section 104 U-shaped and having an open section of this section facing the first beam 108. In a similar manner, to form the second peripheral passage 126, the second peripheral section 106 can be U-shaped with an open section facing the second beam 110.

As illustrated, the second transverse plate piece 122 may be attached to the main piece 102, more specifically the longitudinal plate sub-section 116 of the main piece 102, by having holes 128 provided in the second transverse plate piece 122 such that bolts 130 can be inserted via these holes into threaded holes 131 provided in the longitudinal plate sub-section 116.

The cross member arrangement 100, comprising the main piece 102 and the second transverse plate piece 122, may in the mounted state MS be symmetric with respect to a longitudinal symmetry line L-S. Further, the first and second peripheral section 104, 106 may be symmetric with respect to a transversal symmetry line T-S. The cross member arrangement 100 may also be symmetric with respect to the transversal symmetry line T-S in the mounted state MS.

As illustrated in FIG. 1C, illustrating a cross-sectional view of the cross member arrangement 100 along the longitudinal direction L-D, the cross member arrangement 100 can be formed such that a peripheral vertical distance PVD, extending between a first peripheral vertical end 132 and a second peripheral vertical end 134, is greater than a mid-section vertical distance MSVD, extending between a first mid-section vertical end 138 and a second mid-section vertical end 140. Put differently, a distance between the end points of the peripheral sections 104, 106 may be greater than a distance between the end points of the mid-section 112. By having the cross-member arrangement 100 formed such that the mid-section 112 is narrower than the peripheral sections 104, 106, a first space 142 abutting the first transverse plate sub-section 114 and a second space 144 abutting the second transverse plate piece 122 can be formed. In the first and second space 142, 144 electric components can be housed. As illustrated in FIGS. 1A and 1B, openings may be provided in the cross-member arrangement 100 for facilitating mounting of such components.

The main piece 102 may be cast in one piece, or in any other way three-dimensionally shaped as one piece. In addition to the cost savings associated with using fewer units, this also comes with the advantage that rivets or other protruding attachment elements can be avoided on an outer surface 148 of the first transverse plate sub-section 114. Having the outer surface void of protruding attachment elements reduces the risk that cables may get stuck or are damaged during routing.

The cross member arrangement 100 may together with the first and second beam 108, 110 form a frame 152, which in turn forms part of a chassis 150.

As illustrated in FIG. 1C, cables 154 may be provided in the transversal openings 123, but as discussed above, cables and/or components may also be provided in the first and/or second space 142, 144 and/or in the first and/or second peripheral passage 132, 134.

The cables 154 may be secured to the second transverse plate piece 122 by using cable ties 156. By using the cable ties 156, it is made possible to first attach, or secure, the cables 154 to the second transverse plate piece 122 while this piece is de-attached from the main piece 102. Once the cables 154 are secured, the second transverse plate piece 122, together with the cables 154, can be attached to the main piece 102. Using this approach, it is made easy for a service technician to organize the cables 154. In addition to an ergonomic working position, the service technician is also provided with a better overview of the cables 154.

Figure 2:
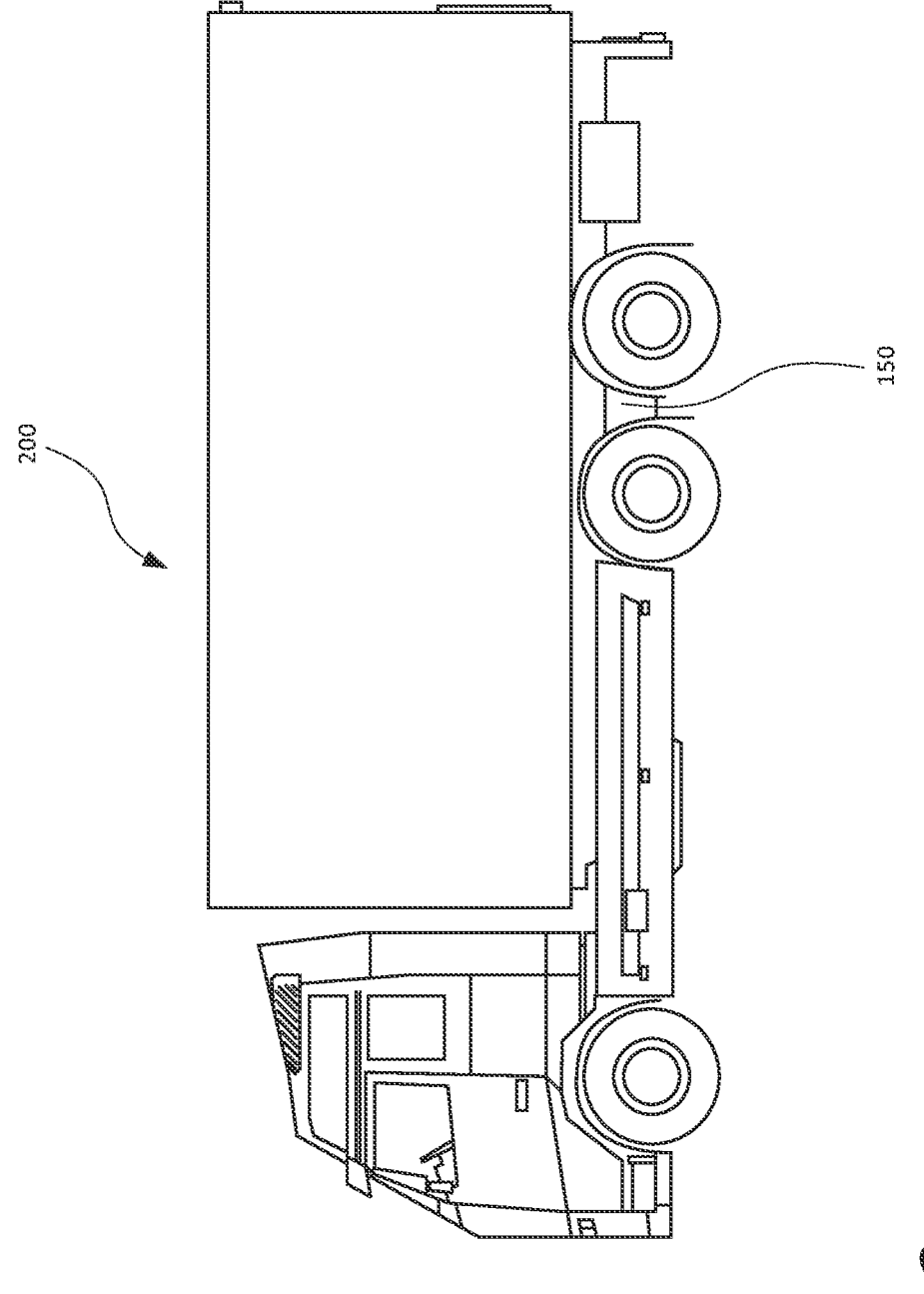
FIG. 2 illustrates a side view of a vehicle having a chassis comprising the cross member arrangement illustrated in FIGS. 1A, 1B and 1C.

FIG. 2 illustrates a vehicle 200, herein exemplified by a truck, provided with the chassis 150 in turn comprising the cross member arrangement 100 illustrated in FIG. 1A-C.

FIG. 3 is a flowchart illustrating a method 300 for producing the chassis 150. In a step 302 the first and second beam 108, 110 may be provided. In a step 304, the cross member arrangement 100 may be provided. After the first beam 108 and the cross member arrangement 100 are provided, the cross member arrangement 100 may be attached to the first beam 108 in a step 306. In a similar manner, the cross member arrangement 100 may be attached to the second beam 110 in a step 308. In a step 310, the cables 154 may be provided in the transversal recesses 120 in the cross member arrangement 100. After the cables 154 are provided, in a step 312, the second transverse plate piece 122 may be attached such that the transversal recesses 120 are formed into the transversal openings 123.

FIG. 4 is a flowchart illustrating a method 400 for re-routing the cables 154 in the vehicle 200. In this context, re-routing should be interpreted broadly and it should be understood to include changing the routing of existing cables, but also adding or removing cables. In a step 402 the second transverse plate piece 122 may be de-attached. By de-attaching this piece, the transversal openings 123 are formed into the transversal recesses 120, thereby making the cables 154 held in the cross member arrangement 100 easily accessible to e.g., a service technician. In a step 404, the cables 154 can be re-arranged, e.g. re-routed, replaced, removed, added etc. After having re-arranged the cables 154, in a step 406, the second transverse plate piece 122 can be attached. As an effect, the transversal recesses 120 are formed into the transversal openings 123, thereby securing the cables 154. Optionally, in a step 408, preceding the step 406 in which the second transverse plate piece 122 can be attached, the cables 154 can be secured to the second transverse plate piece 122 by using the cable ties 156.

Figure 5:
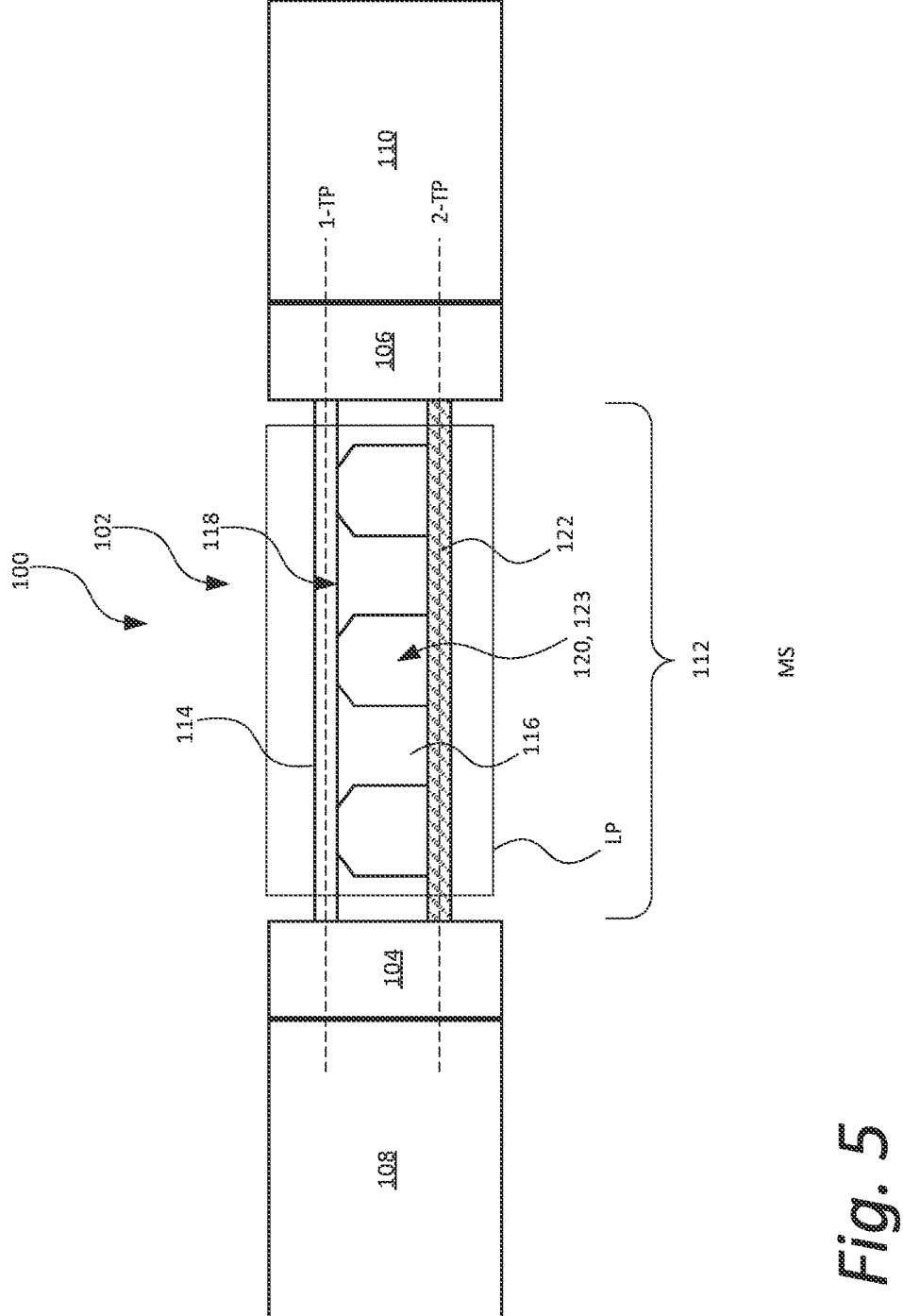
FIG. 5 is another view of FIGS. 1A, 1B and 1C, according to another example.

FIG. 5 provides a general illustration of the cross member arrangement 100 in the mounted state MS, i.e., with the second transverse plate piece 122 attached to the main piece 102. As illustrated and also discussed above with reference to the example illustrated in FIG. 1A to 1C, the main piece 102 may comprise a first peripheral section 104 and a second peripheral section 106. The first peripheral section 104 may be attached to the first beam 108, and the second peripheral section 106 may be attached to the second beam 110. The first transverse plate sub-section 114 of the mid-section 112 may be arranged in the first transverse plane 1-TP. The longitudinal plate sub-section 116 of the mid-section 112 may be placed in a longitudinal plane LP. The first side 118 of the longitudinal plate sub-section 116 may abut the first transverse plate sub-section 114. The transversal recesses 120 may be provided in the longitudinal plate sub-section 116. In mounted state MS, as illustrated, the transversal recesses 120 may be formed into the transversal openings 123 by attaching the second transverse plate piece 122.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A cross member arrangement for a chassis of a heavy vehicle, comprising:

a main piece comprising:

a first and a second peripheral section for attachment to a first and a second beam of the chassis, respectively; and a mid-section attached to the first and second peripheral section, wherein the mid-section comprises a first transverse plate sub-section placed in a first transverse plane, and a longitudinal plate sub-section placed in a longitudinal plane, wherein a first side of the longitudinal plate sub-section abuts the first transverse plate sub-section, wherein the longitudinal plate sub-section is provided with one or several transversal recesses facing away from the first transverse plate sub-section; and the cross-member arrangement further comprising:

a second transverse plate piece arranged to be attached to the longitudinal plate sub-section of the mid-section and to be placed in a second transversal plane in a mounted state, wherein the transversal recesses are formed into transversal openings in the mounted state with the second transverse plate piece attached to the longitudinal plate sub-section of the mid-section.

2. The cross member arrangement of claim 1, wherein the main piece is cast in one piece.

3. The cross member arrangement of claim 1, wherein the main piece is made of metal.

4. The cross member arrangement of claim 1, wherein the first and the second peripheral sections are U-shaped, thereby forming a first and a second peripheral passage.

5. The cross member arrangement of claim 1, wherein the second transverse plate piece is provided with holes for receiving bolts and the longitudinal plate sub-section is provided with threaded holes for receiving the bolts.

6. The cross member arrangement of claim 1, wherein the cross-member arrangement is symmetric with respect to a longitudinal symmetry line.

7. The cross member arrangement of claim 1, wherein the first and the second peripheral sections are symmetric with respect to a transversal symmetry line.

8. The cross member arrangement of claim 1, wherein a peripheral vertical distance between a first peripheral vertical end and a second peripheral vertical end of the first and the second peripheral sections, respectively, is greater than a mid-section vertical distance between a first mid-section vertical end and a second mid-section vertical end such that a first and/or second space for holding electric or electronic components are formed.

9. The cross member arrangement of claim 1, wherein the second transverse plate piece is provided with protrusions arranged to interact with the longitudinal plate sub-section in the mounted state.

10. The cross member arrangement of claim 1, wherein an outer surface of the first transverse plate sub-section, the outer surface facing away from the longitudinal plate sub-section, is void of protruding attachment elements.

11. A chassis comprising a frame, the frame comprising a first and a second beam connected to each other by the cross member arrangement of claim 1.

12. A vehicle comprising the chassis of claim 11.

13. A method for re-routing cables in a vehicle comprising the cross member arrangement of claim 1, the method comprising:

de-attaching the second transverse plate piece such that the transversal openings are formed into transversal recesses, thereby releasing cables held in the transversal openings;

re-arranging the cables; and attaching the second transverse plate piece to the main piece such that the transversal recesses are formed into transversal openings, thereby securing the re-arranged cables in the cross member arrangement.

14. The method of claim 13, further comprising, preceding the step of attaching the second transverse plate piece, securing the cables to the second transverse plate piece by using cable ties.

* * * * *